(12) United States Patent
Kartner et al.

(10) Patent No.: US 8,649,086 B2
(45) Date of Patent: Feb. 11, 2014

(54) APPARATUS AND METHOD FOR GENERATING HIGH-INTENSITY OPTICAL PULSES WITH AN ENHANCEMENT CAVITY

(75) Inventors: Franz X. Kartner, Newton, MA (US); Gilberto Abram, Brooklyn, NY (US); William P. Putnam, Cambridge, MA (US); Shu-Wei Huang, Cambridge, MA (US); Edilson L. Falcao-Filho, Recife (BR)

(73) Assignee: Massachusetts Institute of Technology, Cambridge, MA (US)

( * ) Notice: Subject to any disclaimer, the term of this patent is extended or adjusted under 35 U.S.C. 154(b) by 451 days.

(21) Appl. No.: 12/894,620

(22) Filed: Sep. 30, 2010

(65) Prior Publication Data

US 2011/0073784 A1 Mar. 31, 2011

Related U.S. Application Data

(60) Provisional application No. 61/247,139, filed on Sep. 30, 2009.

(51) Int. Cl.
*H01S 3/08* (2006.01)
*H01S 3/109* (2006.01)
*H01S 3/22* (2006.01)

(52) U.S. Cl.
USPC ............ 359/346; 372/5; 372/19; 372/92; 372/99

(58) Field of Classification Search
USPC ......... 372/5, 19, 21, 22, 92, 99, 108; 359/346
See application file for complete search history.

(56) References Cited

U.S. PATENT DOCUMENTS

| 3,909,744 | A | * | 9/1975 | Wisner et al. | 372/95 |
| 5,394,411 | A | * | 2/1995 | Milchberg et al. | 372/5 |
| 5,963,359 | A | | 10/1999 | Shinozaki et al. | |
| 7,321,604 | B2 | * | 1/2008 | Umstadter et al. | 372/2 |
| 7,391,850 | B2 | | 6/2008 | Kaertner et al. | |
| 7,672,342 | B2 | | 3/2010 | Gohle et al. | |
| 2006/0268949 | A1 | * | 11/2006 | Gohle et al. | 372/21 |

OTHER PUBLICATIONS

Moll, Kevin D., et al., "Output Coupling Methods for Cavity-Based High-Harmonic Generation", 14 Optics Express 8189-8197 (Sep. 4, 2006).
Korean Intellectual Property Office, "International Search Report and Written Opinion" (for PCT/US2010/050841—PCT application corresponding to present US application) (Jun. 23, 2011).

* cited by examiner

*Primary Examiner* — Eric Bolda
(74) *Attorney, Agent, or Firm* — Modern Times Legal; Robert J. Sayre (57) ABSTRACT

An enhancement cavity includes a plurality of focusing mirrors, at least one of which defines a central aperture having a diameter greater than 1 mm. The mirrors are configured to form an optical pathway for closed reflection and transmission of the optical pulse within the enhancement cavity. Ring-shaped optical pulses having a peak intensity at a radius greater than 0.5 mm from a central axis are directed into the enhancement cavity. Accordingly, the peak intensity of the optical pulse is distributed so as to circumscribe the central apertures in the apertured mirrors, and the mirrors are structured to focus the pulse about the aperture toward a central spot area where the pulse is focused to a high intensity.

7 Claims, 7 Drawing Sheets

APPARATUS AND METHOD FOR GENERATING HIGH-INTENSITY OPTICAL PULSES WITH AN ENHANCEMENT CAVITY

RELATED APPLICATION

This application claims the benefit of U.S. Provisional Application No. 61/247,139, filed 30 Sep. 2009, the entire content of which is incorporated herein by reference.

GOVERNMENT SUPPORT

The invention was supported, in whole or in part, by Grant No. FA9550-08-1-0409 from the Air Force Office of Scientific Research. The Government has certain rights in the invention.

BACKGROUND

High harmonic generation (HHG) is a known technique for producing extreme ultraviolet radiation in rare gases. Light intensities in excess of $10^{13}$ W/cm$^2$ are typically required. Such high intensities are not typically available directly from the driving laser so parametric amplification, which reduces the pulse repetition rate to a few kHz, is commonly used. Additional amplification stages that also operate at a pulse rate much lower than the hundreds of MHz of a mode-locked laser are commonly used as well. Furthermore, the conversion efficiency to the harmonics is extremely low, between a high of $10^{-5}$ down to $10^{-8}$ or less for the highest harmonics; in other words, the energy content of the initial laser is largely undepleted and ultimately wasted.

An example of an HHG technique is also described in U.S. Application Ser. No. 61/286,347.

SUMMARY

Apparatus and methods for generating high-intensity optical pulses are described herein. Various embodiments of the apparatus and method may include some or all of the elements, features and steps described below.

The apparatus includes an enhancement cavity that includes a plurality of focusing mirrors, at least one of which defines a central aperture having a diameter that can be greater than 1 mm. The mirrors are configured to form an optical pathway for closed reflection and transmission of the optical pulse within the enhancement cavity.

Ring-shaped optical pulsed beams can be generated (e.g., by using a beam transformer to redistribute the intensity of a Gaussian beam generated by a laser) and directed into the enhancement cavity (e.g., through one of the mirrors). The ring-shaped pulses can be ultrashort (i.e., less than 10 ps) and can have a peak intensity at a radius greater than 0.5 mm from a central propagation axis (i.e., the axis along which the pulse propagates and about which the pulse intensity distribution approaches radial symmetry). Accordingly, the peak intensity of the pulse is distributed so as to circumscribe the central apertures in the apertured mirrors, and the mirrors are structured to focus the pulse about the aperture toward a central spot area where the pulse, which is enhanced to a higher energy by additive amplification in the closed loop of the enhancement cavity, can interact with a charged particle (e.g., to emit x-ray radiation or to accelerate the charged particle) or a rare gas (e.g., to partially ionize the gas and emit ultraviolet radiation).

The enhancement cavity can have low-loss and provide high-intensity gain from the mirror surface to the focus while operating in practically a single-mode with a profile that offers good phase matching and a long interaction length for the nonlinear processes of interest.

Optical enhancement cavities described and illustrated herein can provide high optical intensity at a spot area in the center of the cavity and can distribute the optical pulse energy over a large area on the mirrors that define the pathway for the optical pulses circulating in the resonant enhancement cavity. In addition, the field contribution from the mode on the center of the mirrors can be eliminated reducing the risk of damage to the mirrors and enabling formation of the central apertures in the mirrors through which charged particles, electron beams, or EUV radiation can enter and/or leave the enhancement cavity. Consequently, the high energy intensity needed, for example, to ionize a gas can be achieved without damage to the mirrors that can result if that high intensity was concentrated at the center of the mirrors with a Gaussian intensity distribution.

Use of the enhancement cavity for high-harmonic generation (HHG) using a rare gas (and for other applications) is advantageous in that the pulse intensity enhancement allows for use without amplification, retaining the high pulse repetition rate of the driving laser; the confinement of the optical pulses in the enhancement cavity also allows for the reuse of a large fraction of the undepleted energy in the optical pulse for successive passes in the cavity, thereby increasing the conversion efficiency compared with previous HHG techniques.

BRIEF DESCRIPTION OF THE DRAWINGS

In the accompanying drawings, like reference characters refer to the same or similar parts throughout the different views. The drawings are not necessarily to scale, emphasis instead being placed upon illustrating particular principles, discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise defined, terms (including technical and scientific terms) used herein have the same meaning as commonly understood by one of ordinary skill in the art to which the invention belongs. It will be further understood that terms, such as those defined in commonly used dictionaries, are to be interpreted as having a meaning that is consistent with their meaning in the context of the relevant art and are not to be interpreted in an idealized or overly formal sense unless expressly so defined herein. For example, if a particular composition is referenced, practical and imperfect realities may apply; e.g., the potential presence of at least trace impurities can be understood as being within the scope of the description; likewise, if a particular shape is referenced, the shape is intended to include imperfect variations from ideal shapes, e.g., due to machining tolerances.

Spatially relative terms, such as "above," "upper," "beneath," "below," "lower," and the like, may be used herein for ease of description to describe the relationship of one element to another element, as illustrated in the figures. It will be understood that the spatially relative terms are intended to encompass different orientations of the apparatus in use or operation in addition to the orientation depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to" or "coupled to" another element, it may be directly on, connected or coupled to the other element or intervening elements may be present unless otherwise specified.

The terminology used herein is for the purpose of describing particular embodiments and is not intended to be limiting of exemplary embodiments. As used herein, the singular forms, "a," "an" and "the," are intended to include the plural forms as well, unless the context clearly indicates otherwise. Additionally, the terms, "includes," "including," "comprises" and "comprising," specify the presence of the stated elements or steps but do not preclude the presence or addition of one or more other elements or steps.

Figure 1:
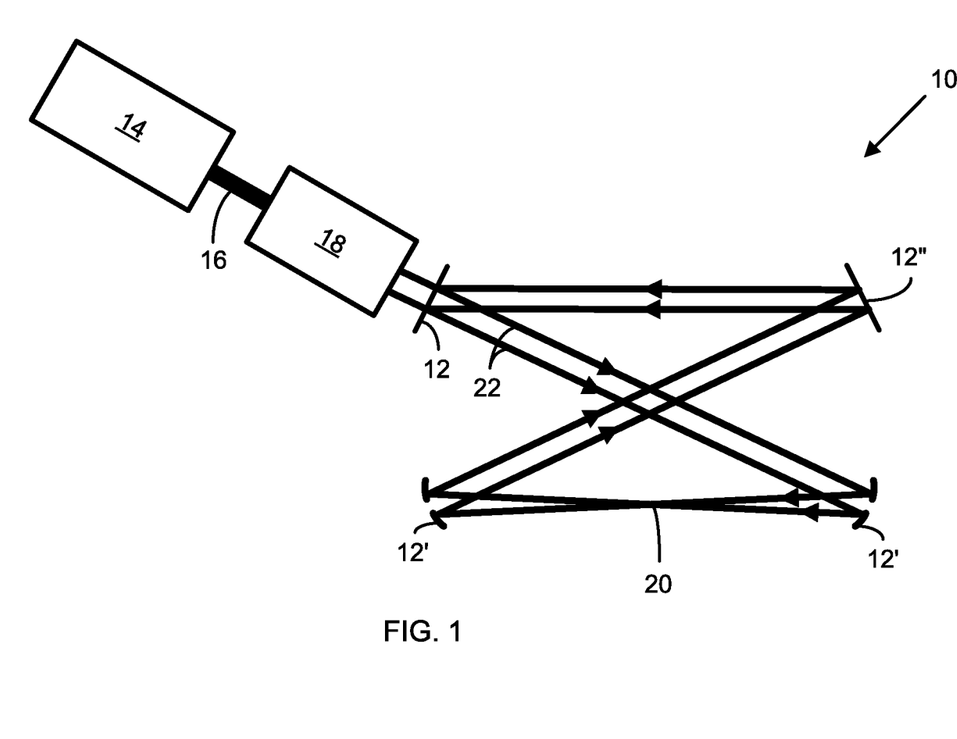
FIG. 1 is a schematic illustration of an apparatus for generating high-intensity optical pulses comprising a laser, a beam transformer and an enhancement cavity including mirrors, two of which include central apertures.

As shown in FIG. 1, an embodiment of the apparatus includes an enhancement cavity 10 including four dispersion-free or low-dispersion mirrors 12/12'/12", wherein at least two of the mirrors 12' are curved and include central apertures with a diameter of at least 1 mm (e.g., between 1 mm and 5 mm). The remaining mirrors 12 and 12" can have a flat, continuous reflecting surface, omitting the central apertures. In other embodiments, more or fewer than four mirrors 12, 12', and 12" can be used depending, for example on the desired configuration and/or path length for the optical pulses in the enhancement cavity 10. The enhancement cavity 10 is maintained under vacuum (i.e., at a pressure well below ambient), e.g., by placing the mirrors in a vacuum enclosure and attaching a vacuum pump to evacuate the enclosure. The enhancement cavity 10 is passive, meaning that the components of the enhancement cavity 10 do not contribute energy to the optical pulses in the cavity 10; in contrast, an "active" enhancement cavity may include a laser medium inside it, providing additional gain to the optical pulses, which may compensate for losses therein.

A laser 14, such as a mode-locked laser (e.g., a diode-pumped Yb-based solid-state or fiber laser) or a fiber laser, or an amplifier or a combination thereof generates the optical pulses 16, which can have a Gaussian distribution. The pulse length can be as low as, e.g., 5 to 10 femtoseconds. The intensity distribution of the optical pulses is shifted to a ring shape (with a reduced intensity at the center and with a spatial pattern similar to that of a truncated Bessel beam) by a mode converter 18, such as a beam transformer (including, for example, an axicon) or, in the case of fiber lasers, a long-period grating. The envelope of a Bessel function goes as $1/\sqrt{r}$, so the differential energy per radial increment is $dE=2\pi r|u|^2 dr \sim dr$. The ring-shaped pulses are coherently added in the enhancement cavity 10 to produce a higher-intensity enhanced optical pulse 22 via constructive interference.

The laser 14 and enhancement cavity 10 are locked to each other so that light pulses travelling in the enhancement cavity are increased by addition of light pulses into the cavity 10. The enhancement cavity 10 has high quality factor, Q, which is promoted by the cavity being passive; a high finesse, F; and a roundtrip time (i.e., the time required to traverse a full loop across the optical pathway defined by the mirrors 12/12'/12") of $T_R$. Aggregated pulses fill the cavity 10 to near maximum capacity after a loading time of $T_{load}$, which approximately equals the product of $T_R$ and F.

A particular challenge associated with HHG is that an optical intensity of $10^{13}$ W/cm² (and preferably up to about $10^{15}$ W/cm² or slightly above) is typically needed to excite the rare gas, while the surface of the dielectric mirrors typically can withstand a peak intensity of only about $10^{10}$-$10^{12}$ W/cm², depending on the fabrication process. To generate harmonics efficiently, the intensity in the middle of the cavity can be made two or three orders of magnitude higher than the intensity at the surface of the mirrors using the mirrors, configurations and methods described herein. Using a tight focusing cavity is a less desirable option because the mirrors will be located toward the edge of stability and also because the rapidly changing phase at the focus limits the length over which HHG can occur without being limited severely by phase mismatch. The use of mirrors with large apertures (e.g., having diameters between 1 mm and 5 mm) also enables an output coupling efficiency of the harmonic radiation of nearly 100%.

Figure 2:
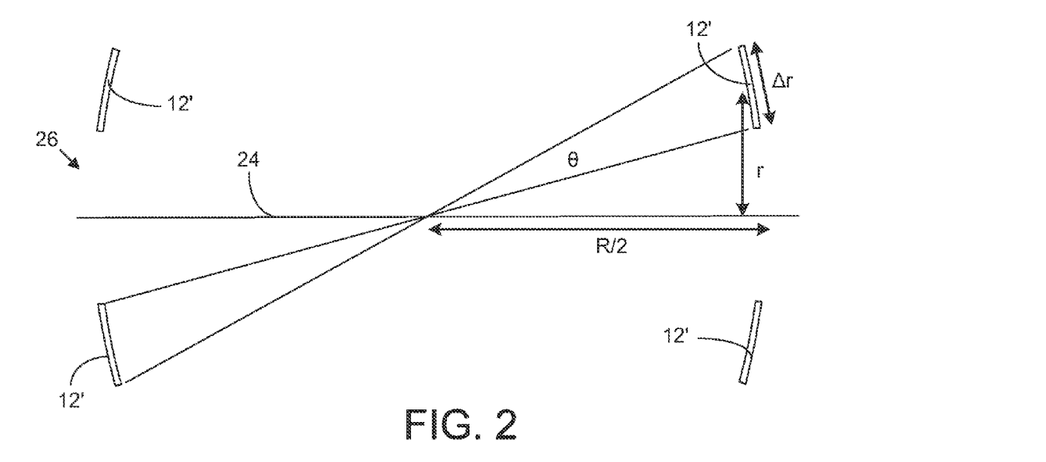
FIG. 2 is an illustrative depiction of the configuration of two apertured mirrors oppositely spaced apart for focused reflection of a light pulse about a central aperture in the mirrors.

The mirrors 12' having the central apertures 26, further illustrated in FIG. 2, have a radius of curvature, R (e.g., in the range from 10 to 40 cm, for example, 20 cm); an average radius, r, from a central axis 24 (e.g., in the range from 1 to 2 mm, for example, 1.5 mm); and a ring thickness, $\Delta r$ (e.g., in the range from 500 to 1200 μm), where λ is the wavelength of the driving laser (e.g., in the range from 500 nm to 2.5 μm, for example, 1 μm). For an example cavity consisting of only the two apertured mirrors 12' in the confocal arrangement, $\Delta r$ can be estimated:

$$\Delta r = \frac{\lambda}{2\sin\theta} \approx \frac{\lambda}{2\theta} \approx \frac{\lambda}{2 \cdot \frac{2\Delta r}{R}} = \frac{\lambda R}{4\Delta r},$$

from which it follows that $\Delta r \sim \sqrt{\lambda R}$. The average radius, r, in specific embodiments is less than R/100. For the same example cavity arrangement, the cavity gain, g, can be estimated as $$g \approx 119.2 \cdot \frac{r^2}{\lambda r},$$

while spot size, $w_0$, at a focus point in the center of the cavity (i.e., midway right-to-left, as illustrated, between the mirrors), where the enhanced optical pulse can interact with, e.g., a charged particle, electron or rare gas (e.g., helium, neon, argon, krypton, and/or xenon), can be estimated as $$w_0 \approx 0.177 \cdot \frac{\lambda R}{r}.$$

Therefore, this enhancement cavity allows for an intensity gain of three orders of magnitude, reaching energy intensities compatible with high harmonic generation at the focus (e.g., on the order of $10^{13}$, $10^{14}$ or $10^{15}$ W/cm$^2$), while not damaging the mirrors.

The total optical path length defined by the mirrors 12/12'/12" and traversed as a loop by the enhanced pulse in the enhancement cavity 10 can be in the range from 10 cm to 3 meters.

Figure 3:
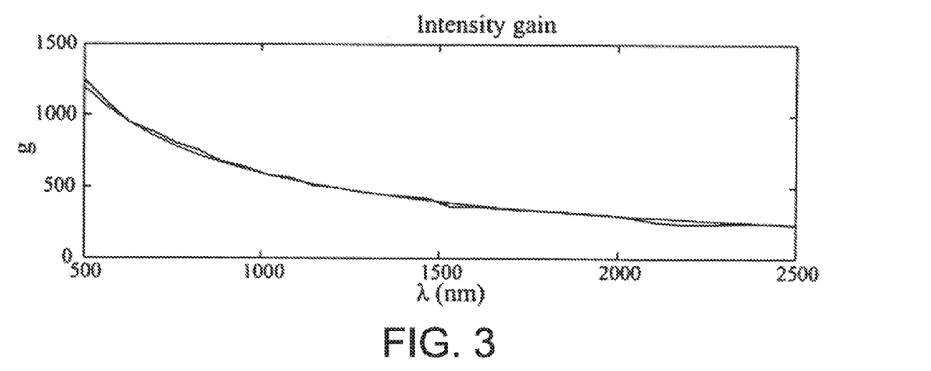
FIG. 3 is a plot of an example of intensity gain, g, of a pulse as a function of the pulse's wavelength.
Figure 4:
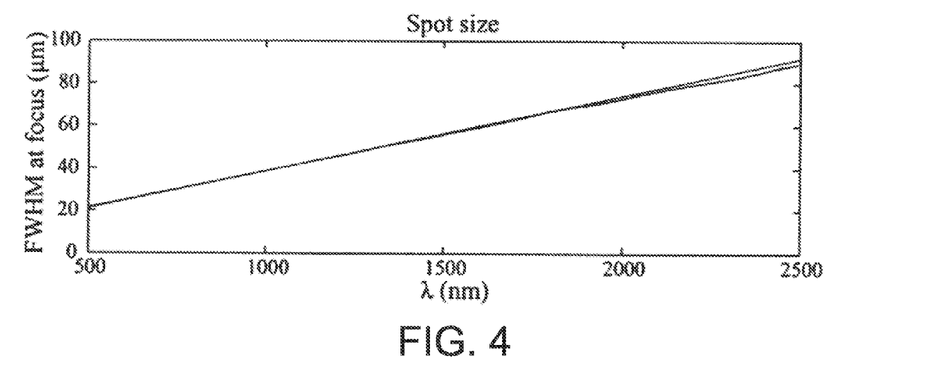
FIG. 4 is a plot of an example of spot size, as a function of pulse wavelength.

An example of the relationship of intensity gain, g, as a function of wavelength, λ, is illustrated in FIG. 3, while an example of the relationship of spot size (measured as full width at half maximum at the focus) as a function of λ is plotted in FIG. 4 for the same embodiment.

Figure 5:
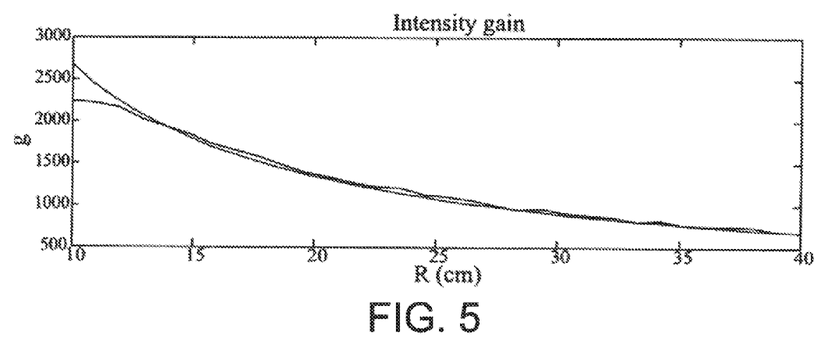
FIG. 5 is a plot of an example of intensity gain, g, of a pulse as a function of the radius curvature, R, of the apertured mirrors.
Figure 6:
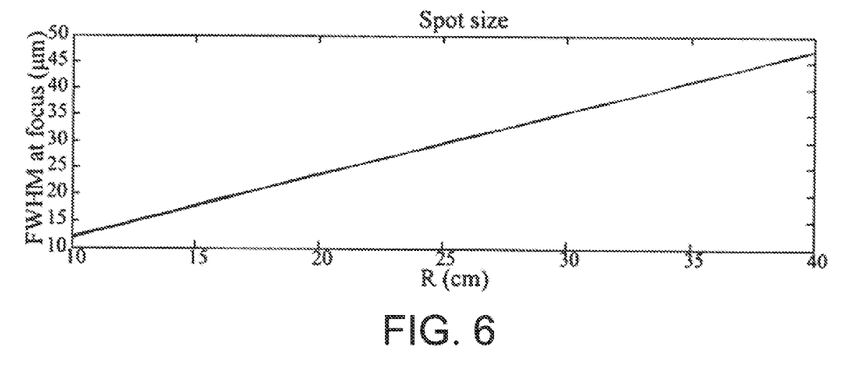
FIG. 6 is a plot of an example of spot size, as a function of the radius curvature, R, of the apertured mirrors.

An example of the relationship of intensity gain, g, as a function of radius of curvature, R, is shown in FIG. 5, while an example of the relationship of spot size (measured as full width at half maximum at the focus) as a function of R is plotted in FIG. 6 for the same embodiment.

Figure 7:
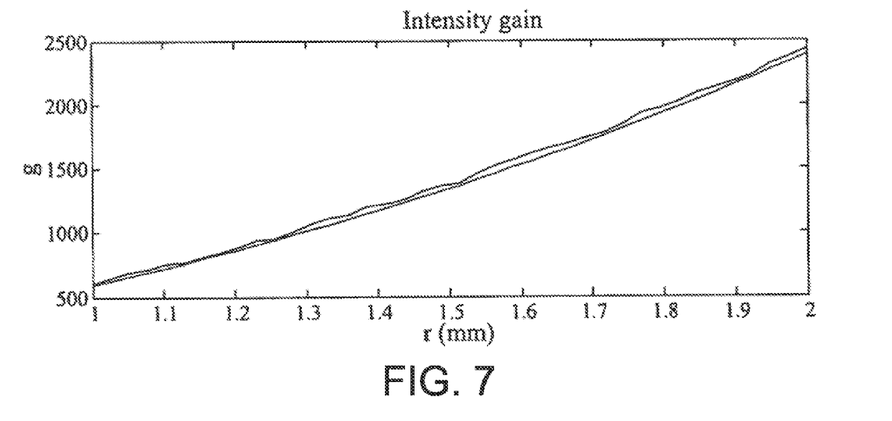
FIG. 7 is a plot of an example of intensity gain, g, as a function the average radius, r, of the apertured mirrors from a central axis.
Figure 8:
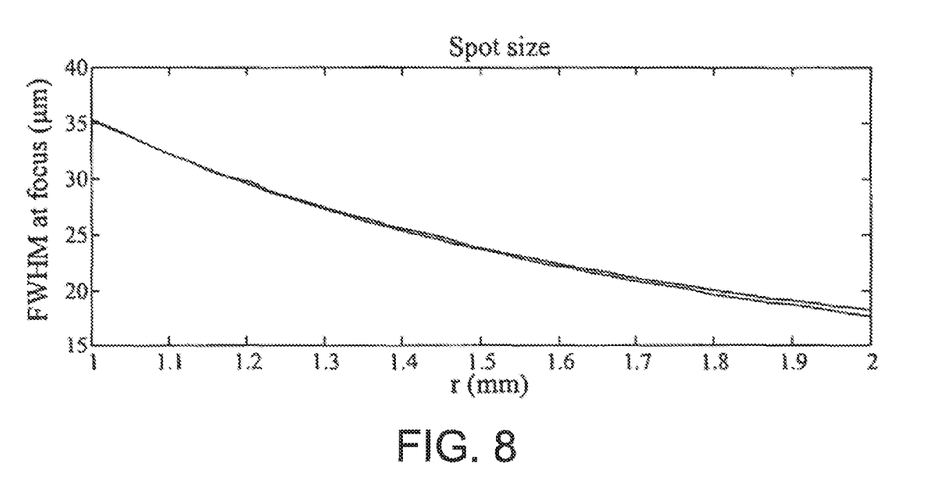
FIG. 8 is a plot of an example of spot size as a function the average radius, r, of the apertured mirrors from a central axis.

An example of the relationship of intensity gain, g, as a function of average radius, r, is shown in FIG. 7, while an example of the relationship of spot size (measured as full width at half maximum at the focus) as a function of r is plotted in FIG. 8 for the same embodiment.

In one embodiment, the mirrors 12, 12', 12" are model No. PR1-633-99-0537-0.15CC concave mirrors from CVI Lasers of Albuquerque, N. Mex. These mirrors are dielectric mirrors with a power reflectance between 98.5% and 99.5%. The average radius of the ring (i.e., the remaining portion of the mirror after the aperture is formed) in the apertured mirrors 12' from a central axis 24 of substantial radial symmetry is 1.3 mm because of a 15 cm curvature and paring with an axicon with a 175° cone angle. A layer of positive photoresist (e.g., S1813 resist) can be deposited on each mirror through which an apertures is to be formed. A mask shaped like a ring (having the pattern shape of the resulting mirrors 12') can be placed on the positive photoresist, and the masked mirror can then be exposed to 400 mm light for the lithography step. The exposed mirror can then be etched using an ammonium fluoride/potassium fluoride etching paste to form the central aperture 26 in the mirror. One example of an apertured mirror 12' produced via this method had a rough border for approximately 25 µm, while the preserved portion was highly circular and precise. In alternative embodiments, the exposed mirror can be etched in hydrofluoric (HF) acid.

One of the mirrors 12 serves as an output (input) coupler through which the optical pulse 16 enters the enhancement cavity. The mirror 12 serving as the output coupler can have an output coupling coefficient of 0.1% to 10%, and the input pulse 16 is critically matched with the enhanced pulse 22 circulating in the cavity 10.

In an embodiment where the mirrors 12, 12', 12" reflect 99% of the power, the width of a transverse cavity resonance will be approximately 1 nm. The optical separation of the mirrors 12, 12', 12" can, therefore, be targeted for a stability within 1 Angstrom of a resonance. To provide this kind of stability, a feedback system moved by a piezoelectric stack can be employed to control one of the cavity mirrors 12, 12', 12".

The mirror control signal can be supplemented with a high-frequency sinusoidal signal (e.g., at 10 kHz) that produces small oscillations around the operating point. A photodetector collects the output of a second mirror, and the output signal from the photodetector is used to measure the small signal gain at the operating point by homodyne detection of the 10 kHz signal. The local small signal gain (i.e., the gain of the HF signal) is proportional to the slope of the resonance peak, and in particular will be zero at the maximum, and vary linearly around it.

Using the small signal gain as the error signal, it is possible to stabilize the cavity. The stabilized cavity was tested successfully with higher-reflectance mirrors, which produced resonant peaks about 2.5 Angstrom wide, so this simple stabilization scheme is able to keep the optical path length between the mirrors stable to within a fraction of an Angstrom.

Applications for the Enhancement Cavity:

Several representative applications in which with the enhancement cavity can be utilized are described, below.

1) Particle Accelerator

Figure 9:
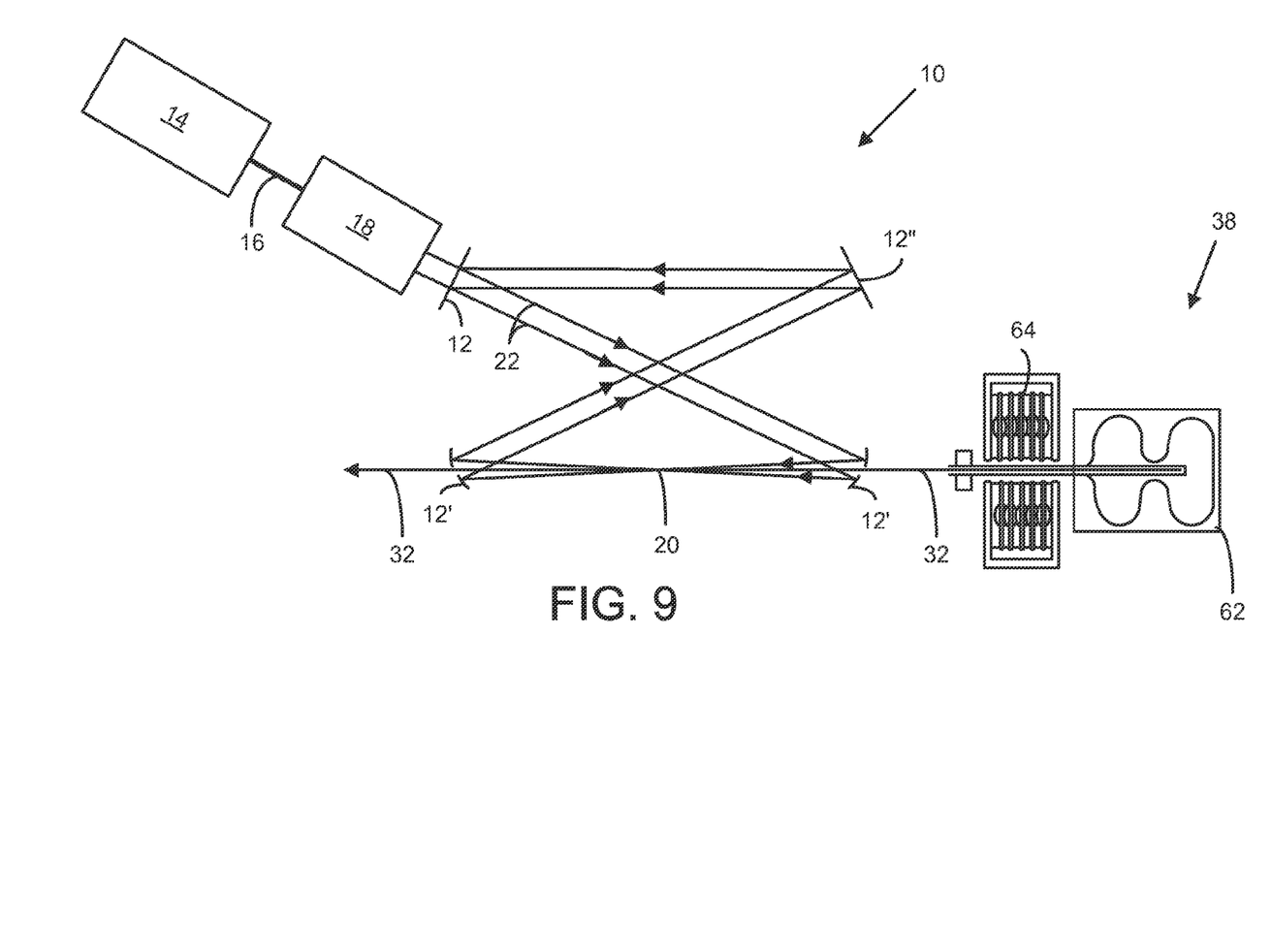
FIG. 9 is a schematic illustration of using the enhancement cavity to accelerate a charged particle.

A charged particle accelerator using the enhancement cavity is shown in FIG. 9, wherein a charged particle 32, such as a subatomic particle (e.g., an electron, positron or proton), from, e.g., an electron source 38 including a photocathode gun 62 and focusing magnet 64, are directed into the enhancement cavity 10, through the central aperture of an apertured mirror 12' into the path of the enhanced optical pulse 22. The charged particle 32 is traveling in the same direction as the enhanced optical pulse 22 is traveling between the apertured mirrors 12'. Accordingly, the enhanced optical pulse 22 intersects the charged particle 32 at a spot area 20 representing a focal point for the apertured mirrors 12', and energy from the enhanced optical pulse 22 is thereby transferred to the charged particle 32 to accelerate the charged particle 32. The optical pulse 22 can be made radially polarized by appropriate polarization optics prior to coupling into the cavity for maximum charged particle acceleration. The accelerated charged particle 32 then passes through the central aperture of the apertured mirror 12' on the opposite side of the enhancement cavity 10 and exits the enhancement cavity 10. It should also be noted that this accelerator structure may also be used for conditioning charged particle beams, e.g., bunching, for further use.

2. X-Ray Generation

Figure 10:
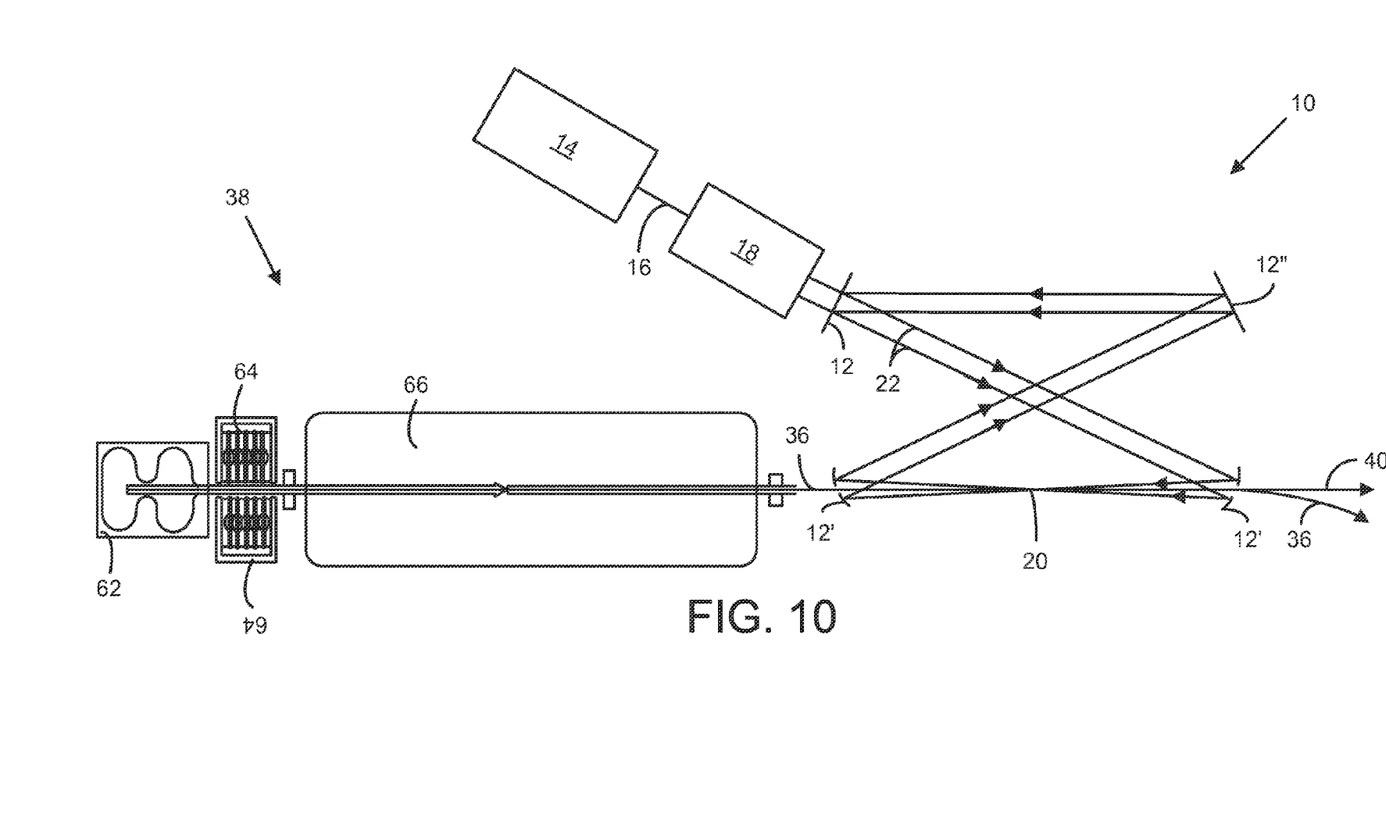
FIG. 10 is a schematic illustration of using the enhancement cavity to generate x-rays via interaction of the enhanced pulse with an electron beam.

In another application, shown in FIG. 10, an electron beam 36 is directed from an electron source 38 (such as a photocathode gun 62, focusing magnet 64, and accelerator 66) into the enhancement cavity through an aperture in an apertured mirror 12' into the pathway of the enhanced linearly polarized optical pulse 22 in a direction opposite to the direction the enhanced optical pulse 22 is traveling between the mirrors 12'. The enhanced optical pulse 22 intersects the electron beam 36 at a spot area 20 and consequently strips energy from the electron beam 36 to release x-rays 40. The electron beam 36 can be focused and guided into the cavity and through the mirrors 12' via magnets. Upon exiting the enhancement cavity 10 with the generated x-rays 40, the electron beam 36 can be peeled away from its linear trajectory by a magnet, thereby separating the electron beam 36 from the generated x-rays 40. Further discussion regarding the use of an enhancement cavity and an electron source to generate x-rays can be found in U.S. Pat. No. 7,391,850 B2 (F. Kaertner, et al., "Compact, High-Flux Short-Pulse X-Ray Source").

3. Ultraviolet Light Generation

Figure 11:
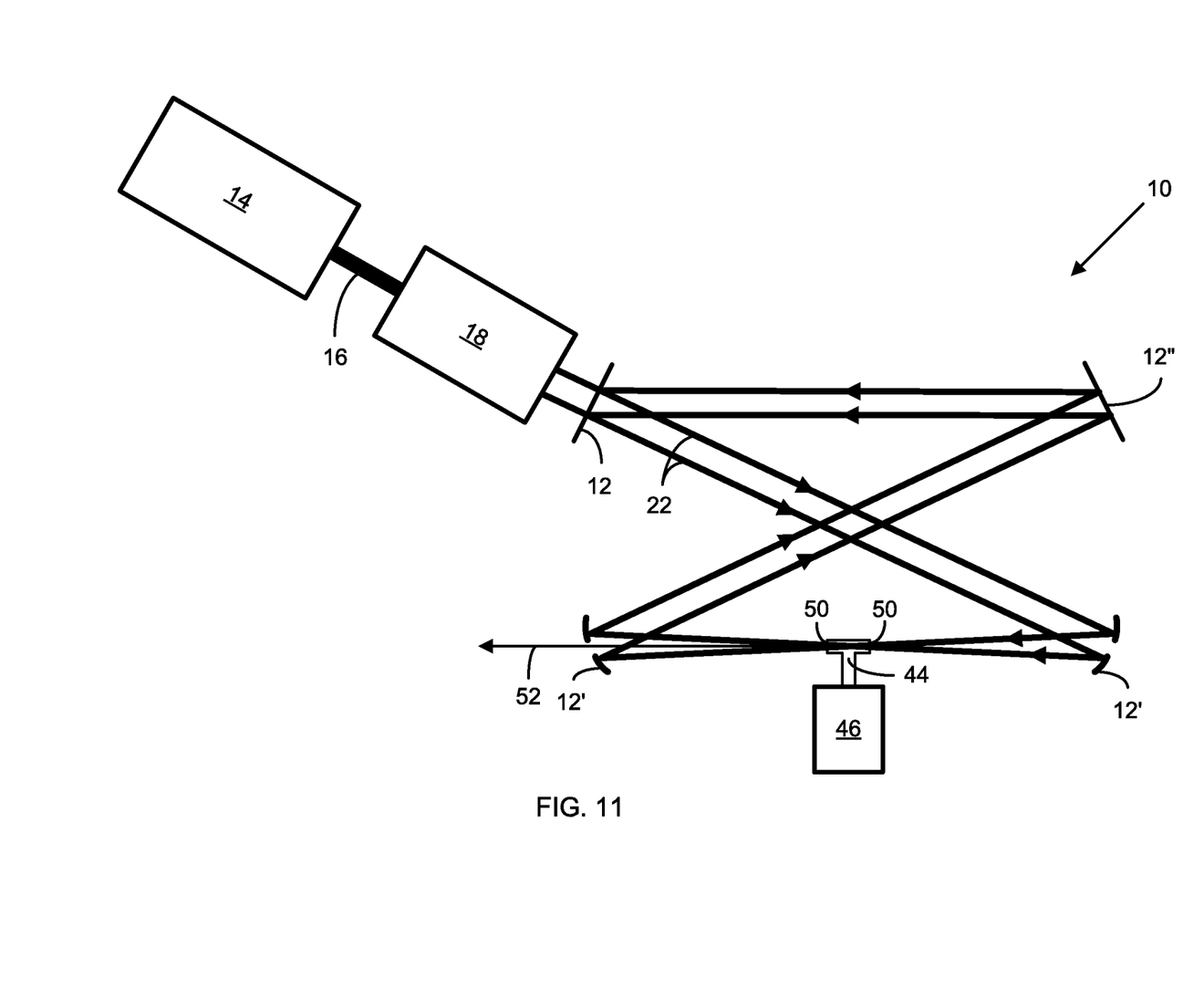
FIG. 11 is a schematic illustration of using the enhancement cavity to generate ultraviolet light via interaction of the enhanced pulse with a rare gas.

In a third application, a rare gas stream is flowed through the path of the enhanced optical pulse 22 in the enhancement cavity 10. A T-shaped conduit 44 extends into the enhancement cavity and is coupled with a compressed rare-gas source 46 (e.g., a compressed gas tank filled with a rare gas). The top section of the conduit 44 is about 1 cm long and includes a pair of open ends 50 on either side of the spot area 20 in the cavity. Through these open ends 50, the rare gas escapes, and the focused linearly polarized optical pulse 22 pass through, such that the energy of the enhanced optical pulse rips electrons off the rare gas atoms; when the electrons recombine with the rare gas atoms, ultraviolet radiation 52 is emitted and directed through the apertured mirror 12' on an opposite side of the enhancement cavity 10. In this embodiment, only the mirror 12' through which the ultraviolet radiation passes needs to include the aperture. A vacuum pump removes the emitted rare gas from the enhancement cavity after the gas leaves the conduit 44.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties are specified herein for embodiments of the invention, those parameters can be adjusted up or down by $1/100^{th}$, $1/50^{th}$, $1/20^{th}$, $1/10^{th}$, $1/5^{th}$, $1/3^{rd}$, $1/2$, $3/4^{th}$, etc. (or up by a factor of 2, 5, 10, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety. Appropriate components and methods of those references may be selected for the invention and embodiments thereof. Still further, the components and methods identified in the Background section are integral to this disclosure and can be used in conjunction with or substituted for components and methods described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A method for generating high-intensity optical pulses comprising:

generating an ultrashort pulsed beam including ring-shaped optical pulses having optical intensity distributions peaking at a radius greater than 0.5 mm from a central propagation axis;

directing the ring-shaped optical pulses into an enhancement cavity comprising a plurality of focusing mirrors, including a first apertured mirror and second apertured mirror, each of which defines a central aperture with a diameter greater than 1 mm;

reflecting the optical pulses with the mirrors in a closed loop inside the enhancement cavity, the peak intensity of the optical pulses striking the apertured mirrors about the central apertures, the optical pulses additively combining in the enhancement cavity to produce an enhanced optical pulse of higher energy;

directing at least one charged particle into the enhancement cavity through the central aperture in the first apertured mirror, the enhanced optical pulse colliding with the charged particle and transferring energy to the charged particle to accelerate the charged particle; and allowing the accelerated charged particle to exit the enhancement cavity, wherein the accelerated charged particle passes through the central aperture of the second apertured mirror as the accelerated charged particle exits the enhancement cavity.

2. The method of claim 1, wherein the ring-shaped optical pulses are generated by passing optical pulses from a laser through a beam transformer.

3. A method for generating high-intensity optical pulses comprising:

generating an ultrashort pulsed beam including ring-shaped optical pulses having optical intensity distributions peaking at a radius greater than 0.5 mm from a central propagation axis;

directing the ring-shaped optical pulses into an enhancement cavity comprising a plurality of focusing mirrors, including a first apertured mirror and a second apertured mirror, each of which defines a central aperture with a diameter greater than 1 mm;

reflecting the optical pulses with the mirrors in a closed loop inside the enhancement cavity, the peak intensity of the optical pulses striking the apertured mirrors about the central apertures, the optical pulses additively combining in the enhancement cavity to produce an enhanced optical pulse of higher energy; and directing a beam of electrons into the enhancement cavity through the central aperture in the first apertured mirror, the enhanced optical pulse colliding with electrons in the beam to release energy in the form of x-ray radiation, wherein the beam of electrons and x-rays pass through the central aperture of a the second apertured mirror and exit the enhancement cavity.

4. An apparatus for generating high-intensity optical pulses comprising:

an enhancement cavity including a plurality of focusing mirrors, including a first apertured mirror and a second apertured mirror, each defining a central aperture with a diameter greater than 1 mm and the mirrors configured to form an optical pathway for closed reflection and transmission of an optical pulse within the enhancement cavity;

a source of ring-shaped optical pulses having optical intensity distributions peaking at a radius greater than 0.5 mm from a central propagation axis, wherein the source is configured and positioned to direct the ring-shaped optical pulses into the enhancement cavity for circulation within the enhancement cavity; and a source of (a) charged particles or (b) electrons configured and positioned to direct charged particles or electrons into the enhancement cavity and through the central apertures of the first and second apertured mirrors.

5. The apparatus of claim 4, wherein the source is configured and positioned to direct the ring-shaped optical pulses through one of the mirrors as the ring-shaped optical pulses enter the enhancement cavity.

6. The apparatus of claim 4, where the source of ring-shaped optical pulses comprises a laser and a beam transformer.

7. An apparatus for generating high-intensity optical pulses comprising:

an enhancement cavity including a plurality of focusing mirrors, wherein at least two of the mirrors define a central aperture with a diameter greater than 1 mm, and wherein the mirrors are configured to form an optical pathway for closed reflection and transmission of an optical pulse within the enhancement cavity; and a source of ring-shaped optical pulses having optical intensity distributions peaking at a radius greater than 0.5 mm from a central propagation axis, wherein the source is configured and positioned to direct the ring-shaped optical pulses into the enhancement cavity for circulation within the enhancement cavity.

* * * * *